(12) United States Patent
Miller

(10) Patent No.: US 7,712,762 B1
(45) Date of Patent: May 11, 2010

(54) VEHICLE-ATTACHABLE APPARATUS

(76) Inventor: Wendell Everett Miller, 1907 Crescent Dr., Warsaw, IN (US) 46580

( * ) Notice: Subject to any disclaimer, the term of this patent is extended or adjusted under 35 U.S.C. 154(b) by 611 days.

(21) Appl. No.: 11/508,393

(22) Filed: Aug. 23, 2006

Related U.S. Application Data

(60) Provisional application No. 60/711,189, filed on Aug. 25, 2005.

(51) Int. Cl.
*B60D 1/54* (2006.01)

(52) U.S. Cl. .................... 280/491.1; 296/159

(58) Field of Classification Search ............. 280/491.1, 280/489, 400, 656; 224/519, 309, 311; 296/10, 296/159; 135/96
See application file for complete search history.

(56) References Cited

U.S. PATENT DOCUMENTS

| | | | |
|---|---|---|---|
| 2,168,661 A * | 8/1939 | Anderson et al. | 296/173 |
| 2,254,437 A * | 9/1941 | Marney | 296/26.1 |
| 3,623,743 A * | 11/1971 | Rohrer | 280/103 |
| 3,703,211 A * | 11/1972 | Bernaerts | 440/79 |
| 4,057,283 A * | 11/1977 | Barnett | 296/173 |
| 4,078,821 A | 3/1978 | Kitterman | |
| 4,088,363 A * | 5/1978 | Palmer | 296/161 |
| 4,969,232 A | 11/1990 | Michel | |
| 5,080,426 A * | 1/1992 | Johnson | 296/161 |
| 5,214,823 A | 6/1993 | Screen | |
| 5,375,902 A * | 12/1994 | Church | 296/169 |
| RE35,482 E * | 3/1997 | Johnson | 280/491.5 |
| 5,664,796 A | 9/1997 | Huyzers | |
| 6,042,175 A * | 3/2000 | Williams | 296/185.1 |
| 6,145,465 A * | 11/2000 | Murphree | 114/353 |
| 6,273,447 B1 | 8/2001 | Wande Berg | |
| 6,502,730 B2 | 1/2003 | Johnson | |
| 6,802,327 B2 * | 10/2004 | Koss | 135/88.08 |
| 7,201,431 B1 * | 4/2007 | Calandruccio | 296/173 |
| 7,229,090 B2 * | 6/2007 | Cumbie | 280/491.3 |
| 7,503,470 B2 * | 3/2009 | Settelmayer et al. | 224/319 |
| 2006/0273622 A1 * | 12/2006 | Laird | 296/168 |

* cited by examiner

*Primary Examiner*—Tony H. Winner
(74) *Attorney, Agent, or Firm*—Wendell E. Miller, Patent Agent

(57) ABSTRACT

A trailer (50) is attachable to a pulling vehicle (22). Attachment to the pulling vehicle (22) provides steering rigidity around a vertical axis (32), permits pivotal freedom around a horizontal transverse axis (30), and optionally permits pivotal freedom around a longitudinal axis (34). A wheel (14), which preferably is steerable, at least partially supports the trailer (50). In a preferred embodiment, a body of the trailer (50) is a clamshell body (52) that is disposed vertically and transversely for traveling, and that includes clamshell portions (54A and 54B). Optionally, the clamshell body (52) is positioned horizontally, the clamshell portions (54A and 54B) are separated, and a tent (74) is erected above one of the clamshell portions (54A or 54B).

20 Claims, 4 Drawing Sheets

VEHICLE-ATTACHABLE APPARATUS

CROSS-REFERENCE TO RELATED APPLICATIONS

The present patent application claims the benefit of U.S. Provisional Patent Application No. 60/711,189, filed Aug. 25, 2005, which is incorporated herein by reference thereto.

STATEMENT RE FEDERALLY SPONSORED RESEARCH OR DEVELOPMENT

Not Applicable

REFERENCE TO "SEQUENCE LISTING"

Not Applicable

BACKGROUND OF THE INVENTION

1. Field of the Invention

The present invention relates generally to vehicle-attachable trailers. More particularly, the present invention pertains to trailers for non-articulated attaching to a pulling or towing vehicle, for general hauling purposes, for transporting recreational vehicles, and for use as camping trailers.

2. Description of the Related Art

Personal trailers are almost a necessity for home owners who typically need to transport dirt, rock, fertilizer, or building supplies. Trailers have also become a necessity for transporting recreational vehicles such as motorcycles, all terrain vehicles, jet skis, and snowmobiles. Finally, the popularity of outdoor camping and the desire for low-cost lodging has made camping trailers popular. However, backing a trailer is tedious for those who have not developed the skill that is necessary for quick and easy backing.

Camping trailers provide a way to enjoy the outdoors and also avoid much of the cost of lodging. However, the length of conventional trailers make them a nuisance if they are pulled when visiting places of interest, especially towns. And, if left disconnected and unattended, they may be stolen. Thus there is a need for a camping trailer that is both steeringly rigid with the towing vehicle and longitudinally compact.

BRIEF SUMMARY OF THE INVENTION

In a preferred embodiment, the vehicle-attachable apparatus, or vehicle-attachable trailer, is attached to a pulling or towing vehicle with pivotal freedom around a horizontal transverse axis, is steering-rigid with the pulling vehicle with respect to a vertical axis, and is rotationally pivotal around a longitudinal axis. Two transversely-spaced-apart wheels are attached to the apparatus to support at least a portion of the weight of the apparatus and also provide rotational stability with respect to the longitudinal axis.

In an other embodiment, the vehicle-attachable apparatus is a vehicle-attachable camper. The camper comprises a clamshell body that is disposed in an upright position, that is attached to a pulling vehicle, and that tilts backwardly and then opens backwardly to provide a support for a pair of support boards that, in turn, provide support for both a mattress and a foldout tent that is enclosed in the clamshell.

In various embodiments, a single steerable wheel is used to partially support the apparatus. In other embodiments, two steerable wheels are used. Alternately, non-steerable wheel, or a pair of non-steerable wheels are used, and the apparatus is a skid-turn apparatus.

A first object of the present invention is to provide apparatus for steeringly-rigid attachment to a pulling vehicle.

A second object of the present invention is to provide apparatus for attachment to a pulling vehicle that is longitudinally compact.

A third object of the present invention is to provide camping apparatus for attachment to a pulling vehicle that is longitudinally compact, and that is steeringly rigid thereto.

In a first aspect of the present invention, apparatus comprises: a body; means for attaching the body to a pulling vehicle with pivotal freedom around a transverse axis, and with steering rigidity around a vertical axis; means, comprising a first wheel that is attached to the body, for at least partially supporting the body; and means for providing rotational stability of the body with respect to a longitudinal axis.

In a first aspect of the present invention, a method comprises: forming a body with first and second portions having edges that abut at a junction; attaching the body to a vehicle with the edges vertically disposed; supportingly attaching a wheel to the body; preventing steering articulation of the body with the towing vehicle; and the method further comprises rotating the body rearwardly with the edges horizontally disposed, and opening the abutted edges.

In a second aspect of the present invention, a method comprises: forming a body with first and second portions having edges that abut at a junction; attaching the body to a vehicle with the edges vertically disposed; supportingly attaching a wheel to the body; preventing steering articulation of the body with the vehicle; and the method further comprises rotating the body rearwardly with the edges horizontally disposed, rotating one of the portions away from the other of the portions, and supporting both of the portions with the edges horizontally disposed.

In a third aspect of the present invention, a method comprises: forming a closed body with first and second body portions that abut at respective edges; attaching the closed body to a towing vehicle; disposing the edges vertically for traveling; supportingly attaching a wheel to the body; separating the body portions; and positioning one of the body portions horizontally.

In a fourth aspect of the present invention, a method comprises: forming a container including a width, height, and depth; wherein said depth is the smallest dimension thereof; attaching the container to a towing vehicle; supportingly attaching a wheel to the container; disposing a camping enclosure in the container; positioning the container with the depth longitudinally disposed for traveling; and subsequently positioning the depth vertically, and erecting the camping enclosure.

DETAILED DESCRIPTION OF THE INVENTION

Figure 1:
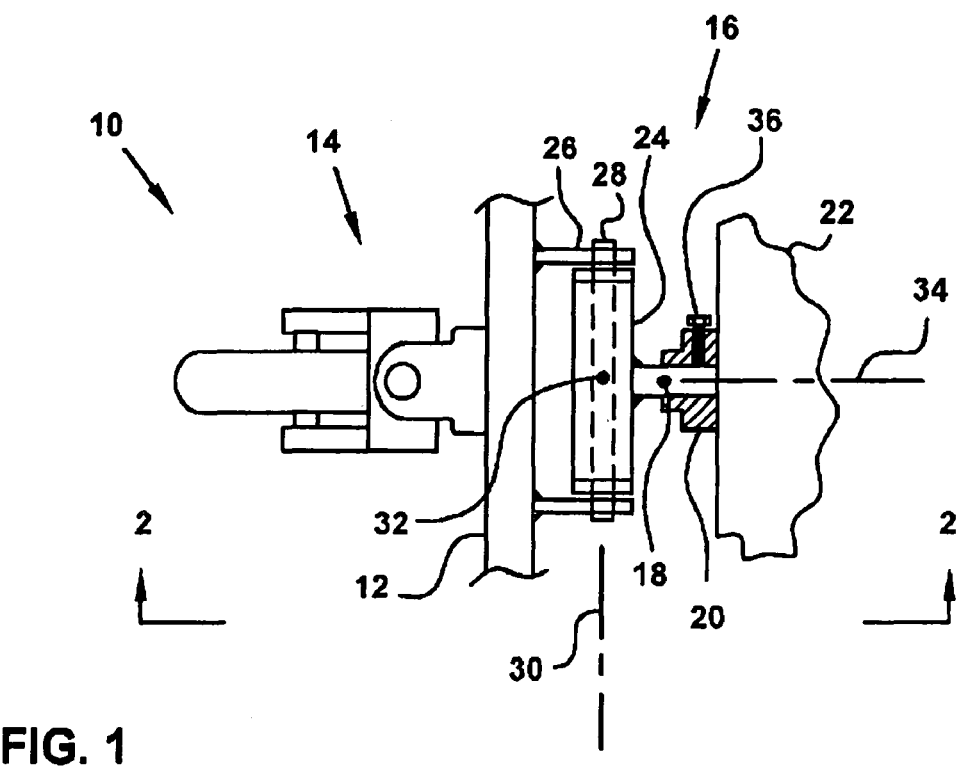
FIG. 1 is a top view, showing an embodiment of the present invention in which a transverse pivot pin provides rotational freedom around a transverse axis, rotation around both vertical and longitudinal axes is precluded, and a single steerable wheel provides support for the apparatus.

Referring now to FIGS. 1 and 1, a vehicle-attachable trailer, or vehicle-attachable apparatus 10 includes a body or transverse tube 12, a steerable wheel 14 that is supportingly attached to the body 12, and a tongue assembly 6 that is welded to the body 12. The tongue assembly 16 includes a stud 18 that is inserted into a receiver 20 of a pulling vehicle, or towing vehicle, 22 of FIG. 1.

The tongue assembly 16 includes the stud 18, a pivot tube 24 that is welded to the stud 18, a pair of pivot lugs 26 that are welded to the transverse tube 12 and that straddle the pivot tube 24, and a transverse pivot pin 28 that is inserted through the pivot tube 24 and both of the pivot lugs 26.

Therefore, means for permitting rotational movement around a transverse axis 30 includes the transverse pivot pin 28. And the tongue assembly 16 provides both steering rigidity around a vertical axis 32 and rotational stability around a longitudinal axis 34. A threaded device 36, as shown in FIG. 1, threadingly engages the receiver 20, and engages the stud 18, thereby providing means for clamping the stud 18 transversely against the receiver 20.

That is, the apparatus 10 is steeringly rigid with respect to the vertical axis 32, is pivotal around the transverse axis 30, and is rigid with respect to the longitudinal axis 34. The tongue assembly 16 is used to provide rotational stability around the longitudinal axis 34 when a single steerable wheel 14 is used.

Figure 2:
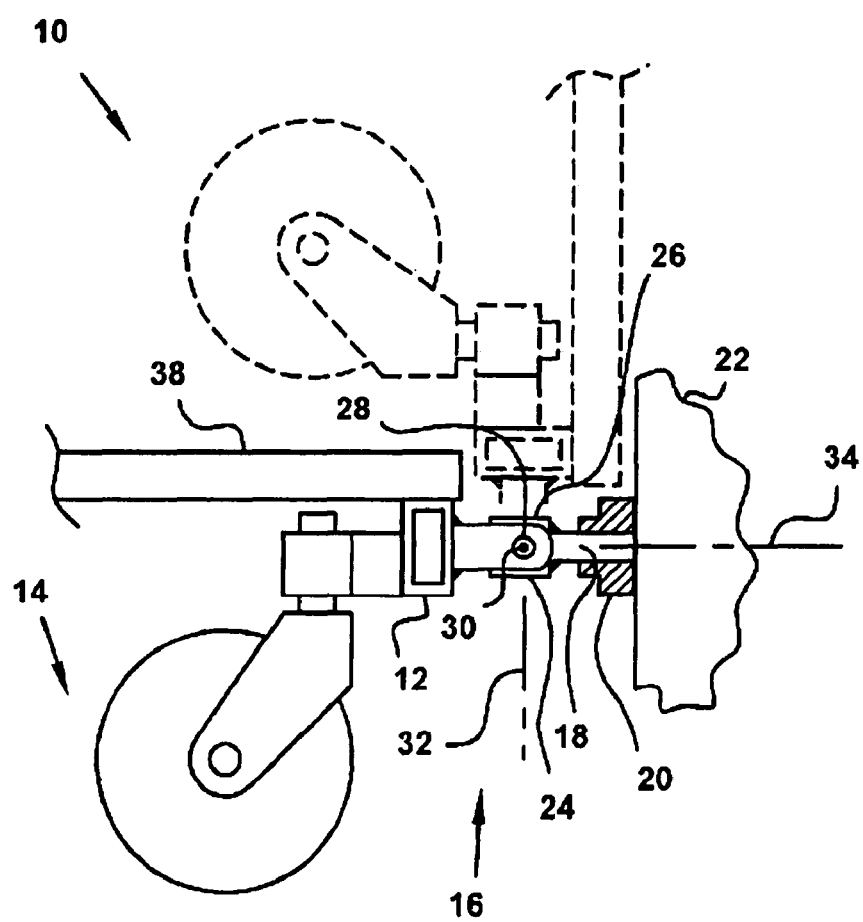
FIG. 2 is a side elevation of the embodiment of FIGURE, taken substantially as shown by View Line 2-2 of FIG. 1, showing a trailer body, or loading deck, that is not shown in FIG. 1, in a loading position, and again, in phantom lines, folded upwardly.

The apparatus 10 includes a loading deck 38 as shown by phantom lines in FIG. 2. The loading deck 38 may be pivoted upwardly around the transverse pivot pin 28 when the apparatus 10 is not being used.

Figure 3:
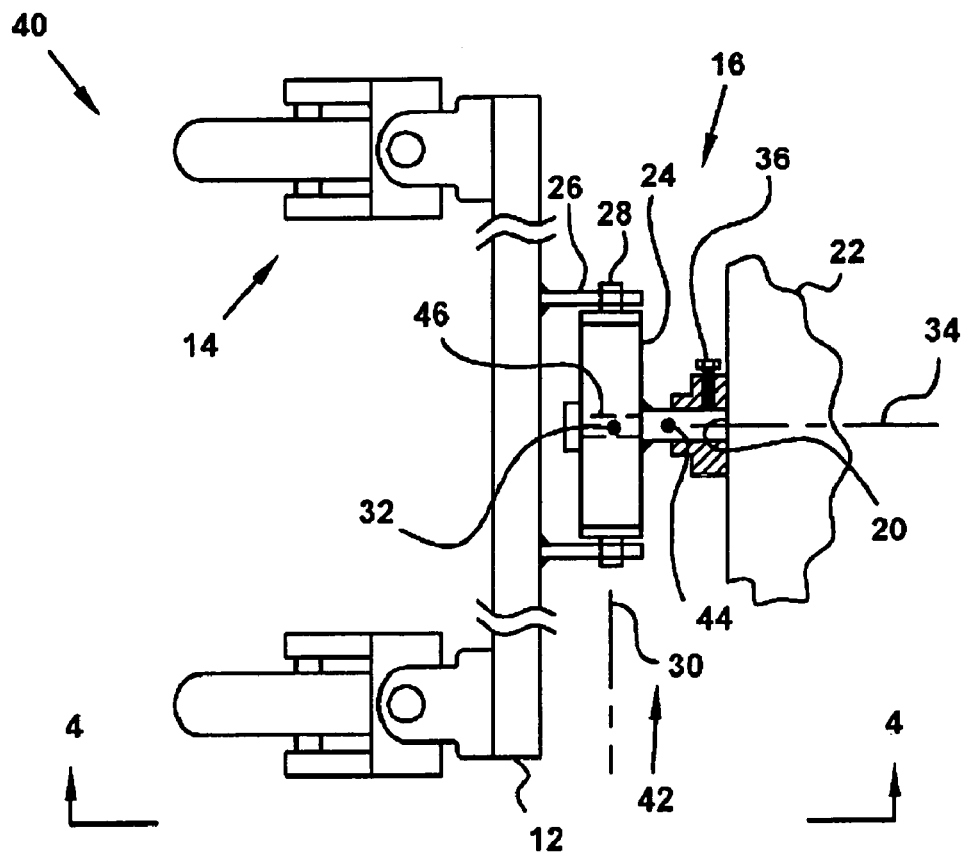
FIG. 3 is a top view, taken the same as FIG. 1, of an alternate, and preferred, embodiment in which the transverse pin of FIG. 1 provides rotational freedom around the transverse axis, a longitudinal pin provides rotational freedom around the longitudinal axis, rotation around the vertical axis is precluded, and both rotational stability around the longitudinal axis and support for the apparatus is provided by two, spaced apart, steerable wheels.
Figure 4:
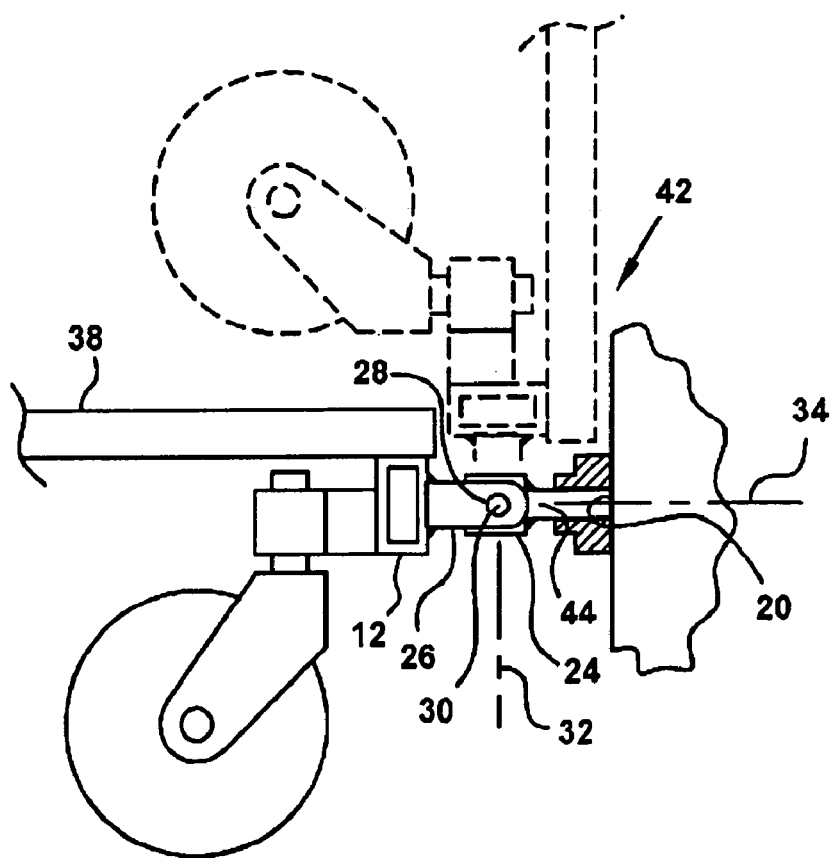
FIG. 4 is a side elevation of the embodiment of FIG. 3, taken substantially as shown by View Line 4-4 of FIG. 3, showing a trailer body or loading deck, that is not shown in FIG. 3, in a loading position, and again, in phantom lines, folded upwardly.

Referring now to FIGS. 3 and 4, vehicle-attachable apparatus 40 includes like-named and like-numbered parts as those of FIGS. 1 and 2, except for that the embodiment of FIGS. 3 and 4 includes two of the steerable wheels 14, and except that the embodiment of FIGS. 3 and 4 does not use the stud 18. Instead, as shown in FIGS. 3 and 4, the vehicle-attachable apparatus 40 includes a pivot stud 42.

As shown in FIGS. 3 and 4, the pivot stud 42 includes a rectangular stud portion 44 that is inserted into the receiver 20. However, as shown only in FIG. 3, the pivot stud 42 includes a cylindrical pivot portion, or longitudinal pivot pin 46 that is pivotally inserted through the tube 24.

Therefore, the cylindrical pivot portion 46 provides rotational freedom around the longitudinal axis 34, the transverse pivot pin 28 provides rotational freedom around the transverse axis 30, and the apparatus 40 is steeringly rigid around the vertical axis 32. Rotational stability around the longitudinal axis 34 is provided by using two of the steerable wheels 14, as shown in FIG. 3.

Figure 5:
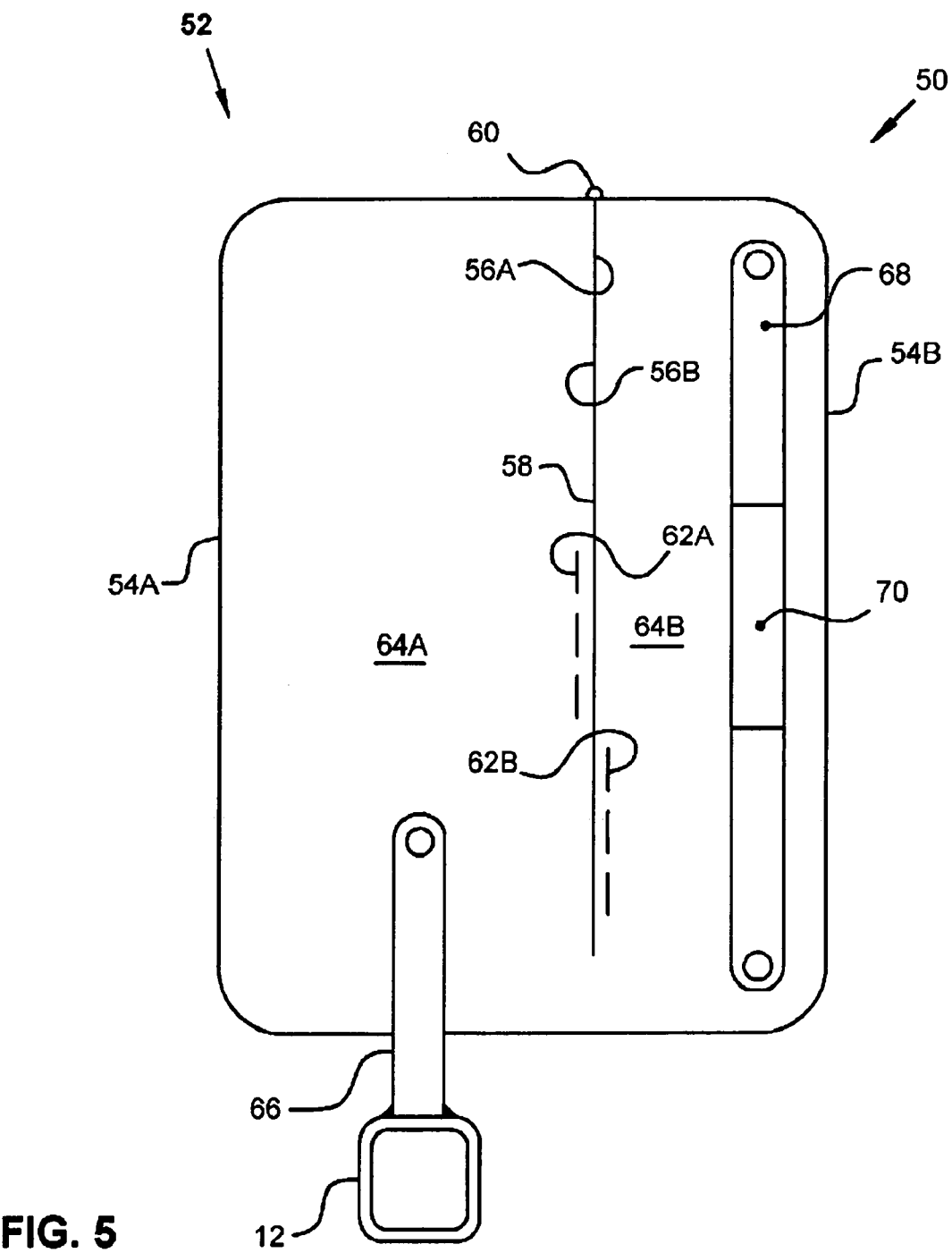
FIG. 5 is a side elevation of a camper apparatus, that comprises a clamshell body that is disposed in an upright position, and that is attached to the body tube of either the embodiment of FIG. 2 or FIG. 4.

Referring now to FIG. 5, a camper trailer, or camper apparatus 50 includes either the vehicle-attachable apparatus 10 of FIGS. 1 and 2, or the vehicle-attachable apparatus 40 of FIG. 3, except for the loading deck 38. More particularly, a clamshell body, a clamshell, a container, a body, or a container body, 52 is attached to the transverse tube 12 of FIG. 1 to the transverse tube 12 of FIG. 3.

The clamshell 52 includes elongated clamshell portions, or body portions, 54A and 54B. The clamshell portions 54A and 54B include, respectively, rims, or sealing edges, 56A and 56B that abut at a junction 58. The edges 56A and 56B are disposed more or less vertically. That is, the clamshell 52 stands upright, if upright is defined as the edges 56A and 56B being nearer vertical than horizontal. A transverse hinge 60, that is horizontally and transversely disposed, connects the clamshell portions 54A and 54B.

Referring now to FIGS. 1, 2, 5, and 6, for traveling, the edges 56A and 56B of the clamshell 52 are aligned generally with both the transverse axis 30 and the vertical axis 32. This orientation of the clamshell 52 minimizes the combined length of the towing vehicle 26 and the trailer 50. Preferably, the combined length is further minimized by prohibiting steering articulation between the towing vehicle 22 and the trailer 50. Before erecting the camping enclosure 72, the clamshell 52 is positioned with the edges 56A and 56B horizontally disposed.

Figure 6:
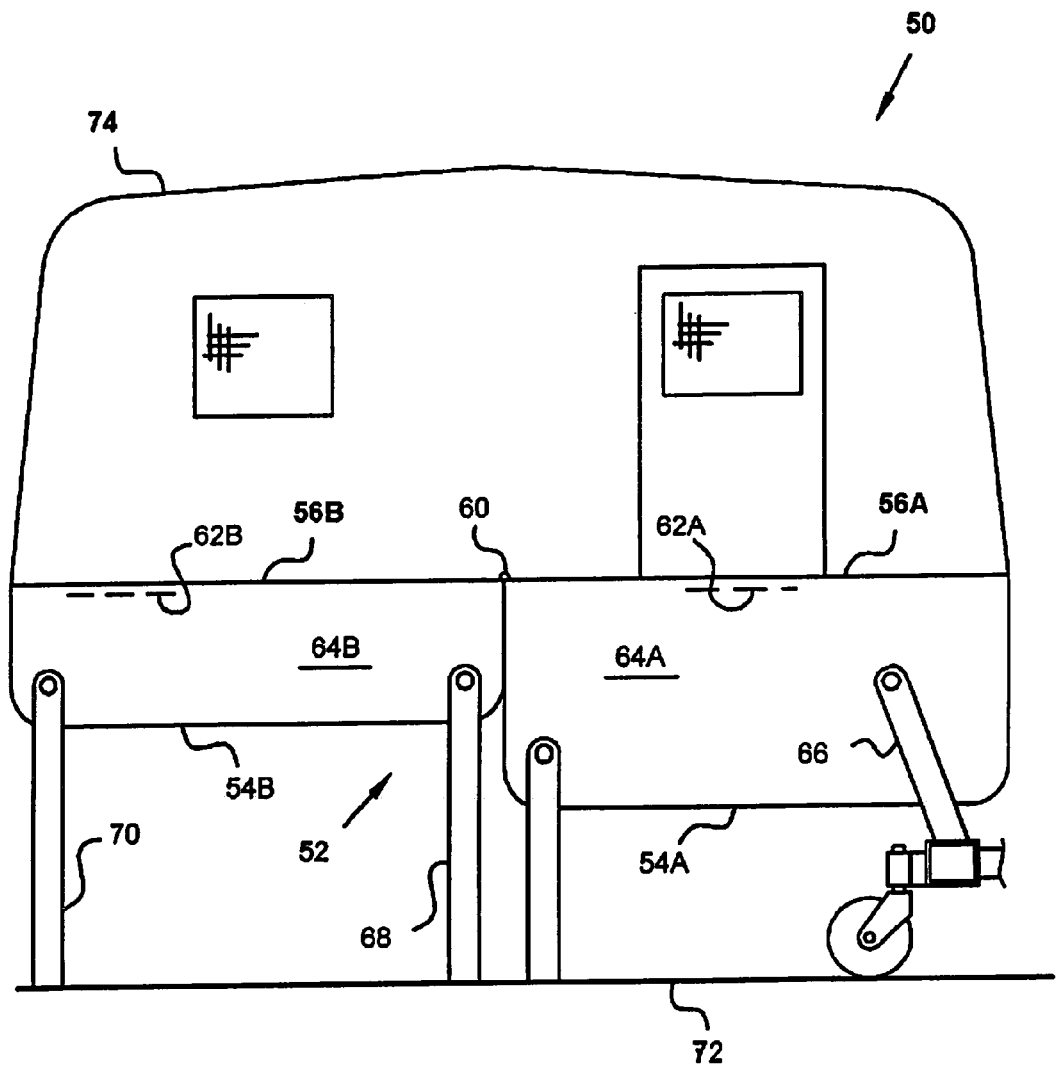
FIG. 6 is a side elevation of the camper apparatus of FIG. 5 with the clamshell body rotated counterclockwise to a horizontal position as viewed in FIG. 5, with the front portion of the clamshell pivoted counterclockwise around a transverse hinge to a horizontal position, with supporting legs positioned, and with a tent erected out of the clamshell body.

Continuing to refer to FIGS. 1, 2, 5, and 6, by definition, a clamshell, such as the clamshell 52, has a thickness that is smaller than its length or width. For traveling, the body, the container body, the container, or the clamshell 52 is disposed with its smallest dimension longitudinally disposed as shown in FIG. 5. And the clamshell 52 is positioned with its thinnest dimension generally vertically disposed for erecting the camping enclosure 72 as shown in FIG. 6.

That is, the clamshell 52 has a height as shown in FIG. 5, a width that is transverse to the height, and a depth. As shown in FIG. 5, the depth is disposed longitudinally for traveling, and as shown in FIG. 6, the depth is disposed horizontally for camping.

Referring now to FIGS. 5 and 6, support boards 62A and 62B, as shown by phantom lines, provide support for a mattress, not shown, when the camper apparatus 50 is opened as shown in FIG. 6, and divide the clamshell body 52 into storage portions 64A and 64B as shown in FIGS. 5 and 6.

Seeing that both of the clamshell portions, 54A and 54B, include a storage portion, 64A or 64B, either one of the clamshell portions, 54A or 54B, is a storage portion, a container, or a body, and the other of the clamshell portions, 54B or 54A, is a cover for the aforesaid container or body.

Continuing to refer to FIGS. 5 and 6, a pair of transversely spaced-apart support bars 66, one of which is shown, are welded to the transverse tube 12 of FIGS. 1 and 2, or to the transverse tube 12 of FIGS. 3 and 4. The support bars 66 are pivotally attached to the clamshell portion 54A, as shown. The camper apparatus 50 further includes a first pair of support legs 68, one of which is shown, and a second pair of support legs 70, one of which is shown.

In FIG. 6, the camper apparatus 50 of FIG. 5 is shown in the tent-up position. As shown, the clamshell portion 54A has been pivoted in a counter-clockwise direction to a position wherein the sealing edge 56A is horizontally disposed, and the clamshell portion 54B has been pivoted around the hinge 60 to a position wherein the sealing edge 56B is also horizontally disposed.

The support legs 68 have been rotated, and are engaging a camping-lot surface 72, and the support legs 70 have also been rotated into engagement with the camping-lot surface 72. And, a tent, a foldable enclosure, or a camping enclosure 74, has been raised above, or erected out of the clamshell 52.

Referring now to FIG. 7, a castor wheel, or castor wheel assembly 80 includes a wheel 82, a castor fork 84 to which the wheel 82 is rotationally attached, a pivot shaft 88 that is fixedly attached to the castor fork 84, and a cam 90 that is fixedly attached to the pivot shaft 88. A cam follower 92 is resiliently urged against the cam 90 by a spring 94, thereby providing resilient restraint of caster-wheel shimmy.

Referring now to FIG. 8, a castor wheel, or castor wheel assembly 100, includes like-named and like-numbered parts as those of FIG. 7, except that instead of using the cam 90 and the cam follower 92 to control castor-wheel shimmy, an hydraulic shock absorber 102 is connected to the pivot shaft 88 by an arm 104, thereby controlling shimmy of the castor wheel 100 hydraulically.

Referring now to FIG. 9, a pair of castor wheels, or castor wheel assemblies, 110 each include one of the wheels 82, one of the castor forks 84, one of the pivot shafts 88, and a roller-chain sprocket 112. The sprockets 112, are connected together by a roller chain 114. Toe-in or toe-out, as desired, is adjusted by rotationally positioning of one of the sprockets 112 with respect to the associated one of the pivot shafts 88. Thus, the use of either toe-in or toe-out may be used to restrain castor-wheel shimmy. Finally, a resilient chain tightener 116 includes an idler sprocket 118 and a spring 120 that cooperate to resiliently keep an opposite side 122 of the roller chain 114 tight, thereby precisely controlling either toe-in or toe-out, irrespective of chain wear.

Referring now to FIG. 10, a pair of castor wheels, or castor wheel assemblies 130, each include one of the wheels 82, one of the castor forks 84, one of the pivot shafts 88, and a drag-link arm 132. A drag link 134 interconnects the drag-link arms 132. The drag link 134 includes a threaded adjustment 136 for adjusting toe-in or toe-out, as desired, thereby controlling castor-wheel shimmy; and the drag link 134 includes a captured-spring device 138 that permits resilient stretching and shortening of the drag link 134.

Preferably, the drag-link arms 132 are rotationally positioned with respect to the wheels 82, approximately as shown. To understand why the steering arms are positioned as shown it is necessary to understand the two reasons that the drag link 134 is needed. The drag link 134 controls shimmy, and the drag link 134 assures same-direction castoring during backing maneuvers.

With regard to shimmy control, when the wheels 82 are in a straight-ahead position, as shown in FIGS. 1 and 3, the drag link 134 controls toe-in, or toe-out, of the wheels 82. If the drag-link arms 132 were rotationally positioned as shown by a line 140, the effective length of the drag-link arms 132 for controlling shimmy would be maximized, but if the drag-link arms 132 were positioned as shown by a line 142, the drag-link arms 132 and the drag link 134 would be totally ineffective for shimmy.

With regard to same-direction castoring, during backing maneuvers, the wheels 82 often castor to rotational positions such as shown in FIG. 10. At this time, respective castoring forces on the wheels 82 may urge them to castor in opposite directions. With the drag-link arms 132 positioned as shown, the drag-link arms 132 and the drag link 134 can force both wheels 82 to rotate in the same direction. However, if the drag-link arms 132 were positioned as shown by the line 140, the drag link 134 would be totally ineffective in forcing the wheels 82 to rotate in the same direction.

With regard to the captured-spring device 138, the drag link 134 functions in a manner similar to a connecting rod between two wheels of a steam locomotive. Therefore, either shortening the drag link 134 to achieve toe-out, or lengthening the drag link 134 to achieve toe-in, results in a drag link that is either to short, or to long, for 360 degree castor rotation of the wheels 82. The captured spring device 138 resiliently allows necessary changes in length for 360 degree castor rotation.

Referring now to FIG. 11, camper apparatus 150 is a smaller, lighter, and wheelless embodiment for direct attachment to, and support by, the receiver 20 of the vehicle 22. However, a pair of transversely spaced-apart hooks 152 are provided for additional support by connecting straps, not shown, to the vehicle 22.

The camper apparatus 150 includes the clamshell 52 with parts as named and numbered with respect to FIG. 5. However, instead of the transversely spaced-apart support bars 66 of FIG. 5, the camper apparatus 150 includes a support yoke 154. The support yoke 154 includes a pair of transversely spaced-apart yoke bars 156, a transverse tube 158, and a receiver stud 160. The yoke bars 156 are each pivotally attached to the clamshell 52 and are each welded to the transverse tube 158, and the transverse tube 158 is welded to the receiver stud 160.

The camper apparatus 150 functions as shown and described for the camper apparatus 50 of FIGS. 5 and 6. More particularly, the clamshell 52 opens, and is supported as shown and described for the camper apparatus 50 of FIGS. 5 and 6.

While neither springs, nor tongue-height adjustment have been shown or described, so many ways for doing this have been taught that it is unnecessary to clutter the present patent application with these mechanical details. Further, while steerable wheels have been shown and described, non-steering wheels can be used, and steering of the vehicle 22 results in skidding the non-steering wheels transversely. Finally, while the clamshell body 52 has been shown and described as the preferred container, it should be understood that any type of container can be included as a part of a vehicle-attachable apparatus of the present invention without departing from the scope of the present invention.

While specific apparatus and method have been disclosed in the preceding description, it should be understood that these specifics have been given for the purpose of disclosing the principles of the present invention, and that many variations thereof will become apparent to those who are versed in the art. Therefore, the scope of the present invention is to be determined by the appended claims.

What is claimed is:

1. A method which comprises:
   a) forming a body with first and second portions having edges that abut at a junction;
   b) attaching said body to a towing vehicle with said edges vertically disposed;
   c) supportingly attaching a wheel to said body;
   d) preventing steering articulation of said body with said towing vehicle; and
   e) said method further comprises rotating said body rearwardly with said edges horizontally disposed, and opening said abutted edges.

2. The method as claimed in claim 1 in which said attaching of said body to said towing vehicle comprises allowing said body to pivot with respect to a transverse axis.

3. The method as claimed in claim 1 in which:
   a) said method further comprises preventing said body from pivoting with respect to a longitudinal axis; and
   b) said preventing step comprises supportingly attaching a second wheel to said body transversely distal from the first said wheel.

4. The method as claimed in claim 1 in which said step of supportingly attaching a wheel to said body comprises supportingly attaching a steerable wheel to said body.

5. The method as claimed in claim 1 in which:
   a) said step of supportingly attaching a wheel to said body comprises supportingly attaching a steerable wheel to said body; and
   b) said method further comprises erecting an enclosure above one of said portions subsequent to said opening step.

6. A method which comprises:
   a) forming a body with first and second portions having edges that abut at a junction;
   b) attaching said body to a towing vehicle with said edges vertically disposed;
   c) supportingly attaching a wheel to said body;
   d) preventing steering articulation of said body with said towing vehicle; and
   e) said method further comprises rotating said body rearwardly with said edges horizontally disposed, rotating one of said portions away from the other of said portions, and supporting both of said portions with said edges horizontally disposed.

7. The method as claimed in claim 6 in which said method further comprises erecting a camping enclosure out of one of said portions subsequent to said rotating step.

8. The method as claimed in claim 6 in which said step of supportingly attaching a wheel to said body comprises supportingly attaching a steerable wheel to said body.

9. The method as claimed in claim 6 in which:
   a) said step of supportingly attaching a wheel to said body comprises supportingly attaching a steerable wheel to said body; and
   b) said method further comprises erecting a camping enclosure above said portions subsequent to said opening step.

10. A method which comprises:
    a) forming a body with first and second body portions that abut at respective edges;
    b) attaching said body to a towing vehicle;
    c) disposing said edges vertically for traveling;
    d) supportingly attaching a wheel to said body;
    e) separating said body portions; and
    f) positioning one of said body portions horizontally.

11. The method as claimed in claim 10 in which said step of supportingly attaching a wheel to said body comprises supportingly attaching a steerable wheel to said body.

12. The method as claimed in claim 10 in which said step of attaching said body to said towing vehicle comprises preventing steering articulation.

13. The method as claimed in claim 10 in which said method further comprises erecting a foldable enclosure above one of said body portions.

14. The method as claimed in claim 10 in which:
    a) said step of supportingly attaching a wheel to said body comprises supportingly attaching a steerable wheel to said body;
    b) said step of attaching said body to said towing vehicle comprises preventing steering articulation; and
    d) said method further comprises repositioning said body horizontally, separating said body portions, and erecting a camping enclosure above one of said body portions.

15. The method as claimed in claim 10 in which said method further comprises:
    a) hinging said body portions along a hinge axis;
    b) repositioning said body horizontally;
    c) pivoting one of said body portions around said hinge axis; and
    d) erecting a camping enclosure above one of said body portions.

16. The method as claimed in claim 10 in which said separating and positioning steps comprise:
    a) rotating said body away from said towing vehicle; and
    b) pivoting one of said body portions away from the other of said body portions.

17. The method as claimed in claim 10 in which said method further comprises:
    a) preventing steering articulation
    b) supporting both of said body portions horizontally disposed; and
    c) erecting an enclosure above said portions.

18. The method as claimed in claim 10 in which:
    a) said method further comprises hinging said body portions along a hinge axis;
    b) said separating step comprises pivoting one of said body portions around said hinge axis; and
    c) said positioning step comprises rotating said body away from said towing vehicle.

19. A method which comprises:
    a) forming a container including a width, height, and depth;
    b) wherein said depth is the smallest dimension thereof;
    c) attaching said container to a towing vehicle;
    d) supportingly attaching a wheel to said container;
    e) disposing a camping enclosure in said container;
    f) positioning said container with said depth longitudinally disposed for traveling; and
    g) subsequently positioning said depth vertically, and erecting said camping enclosure.

20. The method as claimed in claim 19 in which said step of attaching said body to said towing vehicle comprises:
    a) allowing articulation around a horizontal transverse axis; and
    b) preventing steering articulation.

* * * * *